G. B. GRACE.
COMBINED PIN AND DISK GAGE.
APPLICATION FILED MAR. 14, 1918.
1,296,950.
Patented Mar. 11, 1919.
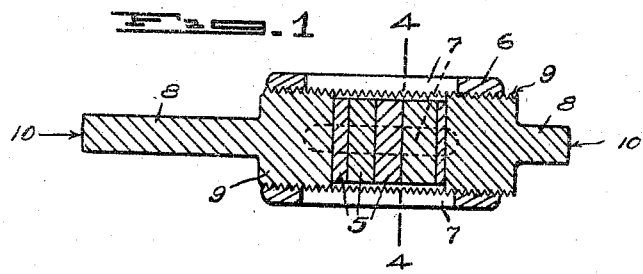
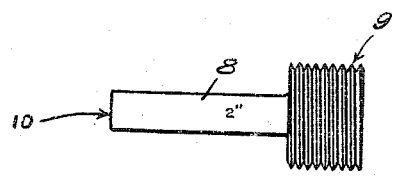
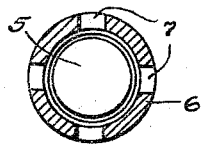
INVENTOR
GORDON B. GRACE
BY
Frank Warren
ATTORNEY

UNITED STATES PATENT OFFICE.

GORDON B. GRACE, OF SEATTLE, WASHINGTON.

COMBINED PIN-AND-DISK GAGE.

1,296,950.   Specification of Letters Patent.   Patented Mar. 11, 1919.

Application filed March 14, 1918. Serial No. 222,488.

*To all whom it may concern:*

Be it known that I, GORDON B. GRACE, citizen of the United States, residing at Seattle, in the county of King and State of Washington, have invented a certain new and useful Improvement in Combined Pin-and-Disk Gage, of which the following is a specification.

My invention relates to improvements in combined pin and disk gages and the method of forming an accurate gage that is adapted to be placed within a cylindrical body to make an accurate measurement thereof and the object of my invention is to provide a set of gage disks and gage pins that do not include any more pieces than the ordinary block gage sets heretofore used but which may be combined and assembled in such manner that a wider range of measurements may be made therewith.

My invention consists in the provision of an internally screw-threaded coupling, pins of accurately measured length each provided on one end thereof with externally screw threaded portions that are adapted to screw into the ends of the coupling and disks of graduated thickness that are adapted to fit within the coupling between the inner ends of two oppositely projecting pins to measure the distance between the inner ends of said pins.

I accomplish this object by devices illustrated in the accompanying drawings, wherein—

Figure 1 is a view in longitudinal midsection of a gage constructed in accordance with my invention as it may appear when assembled;

Fig. 2 is a view in elevation of one of the pins;

Fig. 3 is a view in perspective of one of the disks; and

Fig. 4 is a view in cross section on broken line 4, 4 of Fig. 1.

Referring to the drawings, throughout which like reference numerals indicate like parts, the numerals 5 designate disks of varying size that are made with extreme accuracy and are each marked in decimals of an inch to indicate their thickness as shown in Fig. 3.

The disks 5 are preferably all of the same diameter and are adapted to fit loosely within an internally screw-threaded coupling member 6.

The coupling member 6 is provided at a plurality of points in its circumferential wall with sight slots 7 through which disks 5 may be viewed when they are in positions corresponding to those shown in Fig. 1.

The numeral 8 designates pins of various lengths that are made with extreme accuracy and are each marked in inches to denote the length thereof, as shown in Fig. 2.

Each of the pins 8 is formed with an enlarged threaded end portion 9 that is adapted to be screwed into the end of the coupling 6 as shown in Fig. 1, and is preferably slightly rounded on its other end as indicated by the numeral 10.

In assembling the gage for any desired measurement two pins, the sum of whose lengths is less than the length of measurement desired, are selected and one of the pins is screwed into one end of the coupling 6; a number of disks 5 having a combined thickness equal to the difference between the desired measurement and the combined length of the two pins are then selected and dropped into the coupling 6 so that they rest on the end of the already inserted pin and the other pin is then screwed into the coupling 6 tight enough so that the disks are held firmly but without excessive pressure between the ends of the two pins.

When assembled in this way the total length from end to end of the pins will be equal to the sum of the lengths of the pins plus the sum of the thicknesses of the several disks.

As in the standard disk gage, of well known form, any desired number of disks of different thickness and cylinders of different lengths may be provided with each set, for instance, with a set having a sufficient number of properly graduated disks and cylinders to measure, to the nearest ten thousandth part of an inch, any distance up to one inch, and having eight cylinders of 1, 2, 3, 4, 5, 6, 7, and 10 inches in length, respectively, a range of measurements up to eleven inches only can be obtained while a set constructed in accordance with my invention, a range of measurements varying from the thickness of the smallest disk up to the combined maximum lengths of the disks and the lengths of the two longest pins or a range of eighteen inches can be had.

It is obvious that changes in the form and dimensions of the disks and pins and corresponding changes in the form and size of the coupling therefor may be resorted to without departing from the spirit of my invention.

What I claim is:

A gage of the class described, comprising a plurality of disks of various measured thicknesses and a plurality of pins of various measured lengths each of said pins being screw-threaded on one end and an internally screw-threaded cylindrical coupling having sight slots formed therein said coupling being adapted to have a plurality of said disks placed therein and to have one of said pins screwed into each end of said coupling so that said disks are firmly held between the ends of said pins and the length between the outer ends of said pins is equal to the combined length of said pins and the thickness of said disks.

In witness whereof, I hereunto subscribe my name this 2nd day of March, A. D., 1918.

GORDON B. GRACE.

Copies of this patent may be obtained for five cents each, by addressing the "Commissioner of Patents, Washington, D. C."